United States Patent [19]

Krajewski

[11] 4,198,633

[45] Apr. 15, 1980

[54] ELECTRONIC SIGNAL PROCESSING SYSTEM

[75] Inventor: Zdzislaw A. A. Krajewski, Ajax, Canada

[73] Assignee: Bayly Engineering Limited, Ajax, Canada

[21] Appl. No.: 894,506

[22] Filed: Apr. 7, 1978

[51] Int. Cl.$^2$ .............................................. G01S 3/30
[52] U.S. Cl. ..................................... 343/119; 328/165
[58] Field of Search ................. 343/119, 120; 328/165

[56] References Cited

U.S. PATENT DOCUMENTS

| 3,747,107 | 7/1973 | Poppe et al. | 343/119 X |
| 3,824,596 | 7/1974 | Guion et al. | 343/120 X |
| 3,967,280 | 6/1967 | Mayer et al. | 343/120 X |

*Primary Examiner*—Maynard R. Wilbur
*Assistant Examiner*—Richard E. Berger

*Attorney, Agent, or Firm*—Wenderoth, Lind & Ponack

[57] ABSTRACT

Disclosed is an electronic signal processing system for an alternating voltage input signal. A phase-locked loop network has an input adapted to receive the signal and produce an intermediate signal comprising a substantially noise free sine wave with a phase equal to the average phase of the input signal. The intermediate signal is applied to an input of a variable gain amplifier which produces an output signal proportional to the intermediate signal, and an amplitude averaging loop network has the input signal and the output signal as its inputs and produces a biasing signal which is applied to a control input of the variable gain amplifier to maintain the output signal equal in amplitude to the average amplitude of said input signal. The system can be used in a Watson-Watt type radio direction finder to eliminate noise.

7 Claims, 3 Drawing Figures

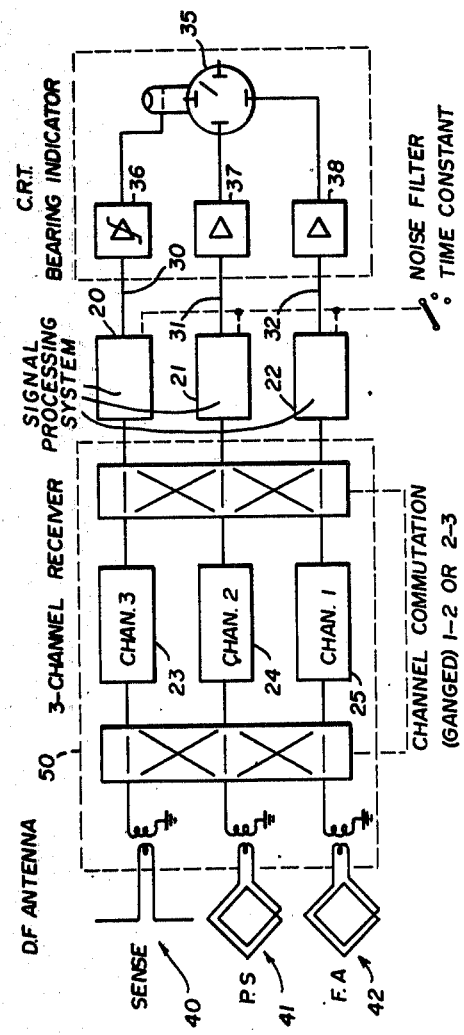
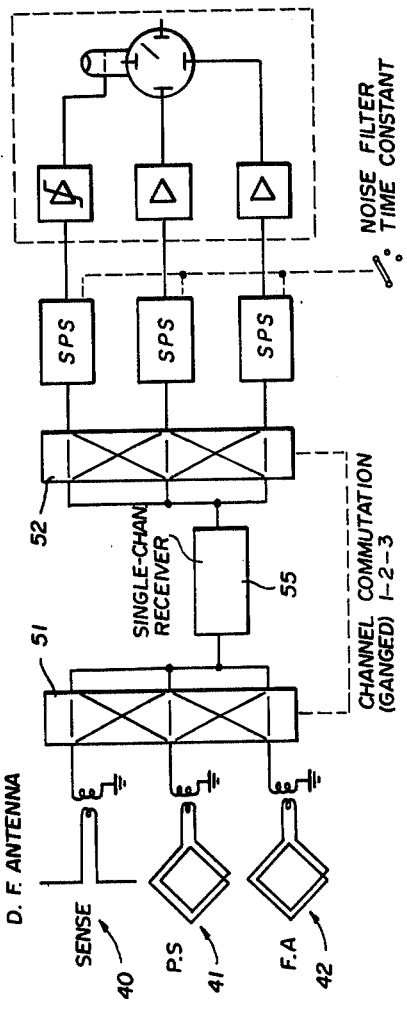
FIG.2
FIG.3

ELECTRONIC SIGNAL PROCESSING SYSTEM

BACKGROUND OF THE INVENTION

This invention relates to an electronic signal processing system which generates a substantially noise free sine wave of amplitude and phase equal to the average amplitude and phase of an input alternating signal.

The types of noise or distortion which the present signal processing system eliminates or reduces include random (white) noise, pulse interference, amplitude and frequency modulation, and phase jitter. Various types of electronic devices, including frequency domain filters, have been constructed for the reduction of some or all of the aforementioned undesirable characteristics found in transmitted electronic signals. The present invention operates on an entirely different principle than such frequency domain filters.

SUMMARY OF THE INVENTION

The present invention replaces an input signal by the output of a sine wave generator. The output signal has a phase equal to the average phase of the input signal, and an amplitude equal to the average amplitude of the input signal, over a controlled sampling period. The output signal is constructed by a voltage controlled oscillator (VCO). The output of the VCO is sampled and compared with the input signal in phase, and any phase difference is detected, averaged, and applied as a bias to the VCO so as to reduce this difference to a minimum. This is commonly known as a phaselocked loop network. In addition, a variable gain amplifier is provided for the VCO output and the output of this amplifier is now compared in amplitude with that of the original input signal. Any amplitude difference is averaged and amplified and applied to control the gain of the variable gain amplifier so as to reduce the difference to a minimum. The amplitude comparison loop network must not be confused with an automatic gain control (AGC) circuit which is designed to give constant output. In the present invention, the amplitude of the output signal of the electronic signal processing system is made equal to the average amplitude of the input signal, sampled over a specific time frame.

According to the present invention there is provided an electronic signal processing system for an alternating voltage input signal comprising a phase-locked loop network having an input adapted to receive said signal and produce an intermediate signal comprising a substantially noise free sine wave with a phase equal to the average phase of said input signal, said intermediate signal being applied to an input of a variable gain amplifier which for any particular value of gain, produces an output signal proportional to said intermediate signal, and an amplitude averaging loop network having said input signal and said output signal as its inputs which produces a biasing signal which is applied to a control input of said variable gain amplifier to maintain said output signal equal in amplitude to the average amplitude of said input signal.

BRIEF DESCRIPTION OF THE DRAWING

The present invention will now be described with the aid of the accompanying drawings, in which:

FIG. 2 is a block diagram showing an application of the present invention in a three channel radio direction finder system;

FIG. 3 is a block diagram showing the present invention used in another three channel radio direction finding system.

DESCRIPTION OF THE PREFERRED EMBODIMENTS

Figure 1:
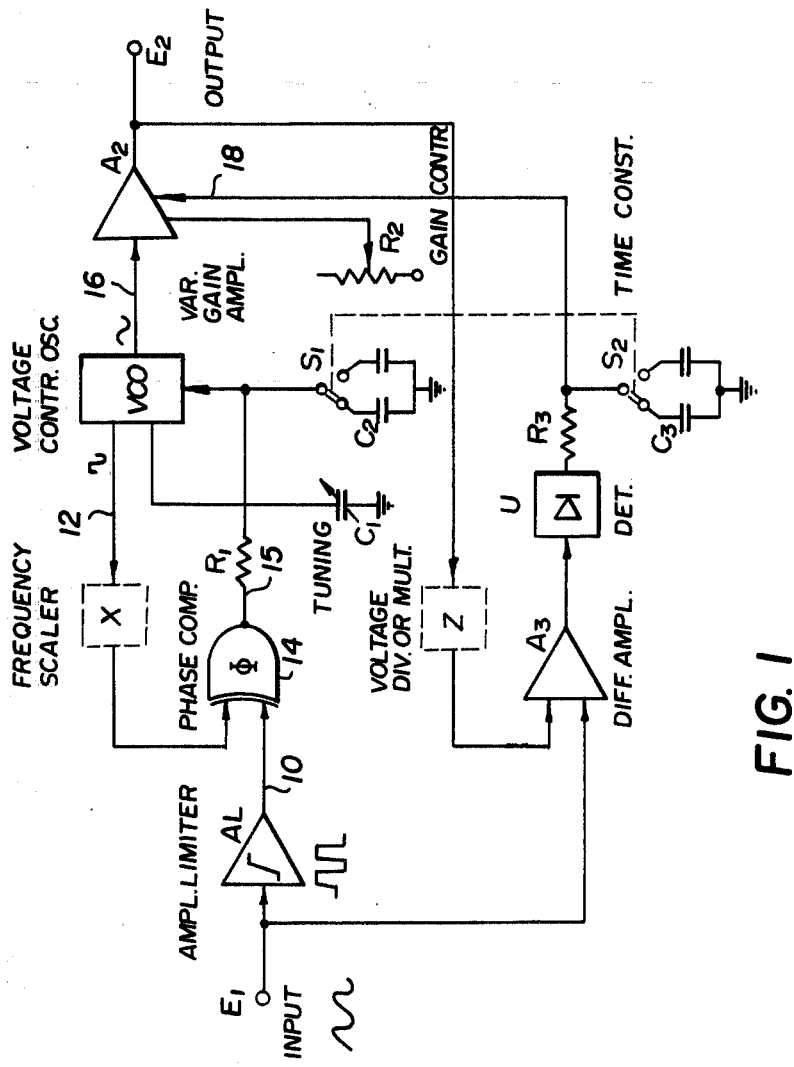
FIG. 1 is a block diagram of an electronic signal processing system according to the invention.

In FIG. 1, the signal input is applied to terminal $E_1$ from where it passes to amplifier limiter AL which raises its amplitude to a convenient handling level and also eliminates any amplitude modulation. In the presence of a signal, a 50% duty ratio square wave is available at the output 10 of the amplifier limiter. The voltage controlled oscillator (VCO) is preset near the input frequency by means of tuning capacitor $C_1$. A square wave VCO output 12 and the output of the amplifier-limiter 10 are now applied as inputs to the phase comparator 14, which is essentially an OR gate, wherein the output of the OR gate is now a linear function of the phase difference of the two inputs. The phase comparator output 15 is now applied to the voltage tuning element of the VCO via an integrating network, shown as the combination of $R_1$ and $C_2$. The time constant of the integrating network determines the time over which the phase-locked network averages the phase difference. It also defines the speed of response of the phase-lock.

A sine wave output 16 of the VCO is applied to the variable gain amplifier $A_2$, the output 17 of which constitutes the output of the signal processing system at terminal $E_2$. The system output and input are now compared in a differential operational amplifier $A_3$. Any amplitude difference is detected by the detector U and average with a time constant of $R_3 C_3$. The average amplitude difference is fed to a control input 18 of the variable gain amplifier $A_2$ to maintain the output signal at $E_2$ at a predetermined level.

For optimum dynamic operation of the signal processing system, the amplitude feedback time constant $R_3 C_3$ and the phase-lock time constant $R_1 C_2$ should be made equal. Both time constants can be made selectable by means of ganged switches $S_1$ and $S_2$. Resistor $R_2$ provides a preset adjustment of the gain of amplifier $A_2$ to bring it within the range of control. Amplifiers $A_2$ and $A_3$ must not show any appreciable phase shift at the operating frequency.

The signal processing system can operate at an output frequency which is a multiple or sub-multiple of the input frequency, and with an output voltage which is a multiple or sub-multiple of the input voltage. In the first case, a frequency scaler must be added in the link from the VCO output to the phase comparator which is shown dotted as X in FIG. 1. The second condition obtains when a voltage divider or multiplier is added in the output sampling line of the amplitude comparator, shown in the dotted block labelled Z in FIG. 1.

One particular application of the signal processing system relates to the three channel Watson-Watt type of radio direction finder. It is generally known that the Watson-Watt direction finder 50 (FIG. 2) comprises three identical receiver channels 23, 24 and 25, each tuned to the same frequency and adjusted to present as near as possible, equal gains and phase shifts. The outputs of the three channels 30, 31 and 32 are applied to the vertical 38 and horizontal 37 deflection and the brightness control 36 of a cathode ray tube indicator 35 in such a way as to display a radial bearing trace indicating the angle of arrival of the radio signal. It is known that, as the radio signal becomes weaker, the background noise will blur the bearing trace, making it difficult for the operator to read the bearing angle. As much as 15 dB signal to noise ratio may be necessary for a clean display. Such an application is depicted in FIG. 2.

In FIG. 2, three identical signal processing systems 20, 21 and 22 are inserted between the end of each receiver channel 23, 24 and 25 and the respective input of the cathode ray tube bearing indicator at 30, 31 and 32 as shown. The signal processing systems each work at the final intermediate frequency, but are independent of each other, each automatically adjusting itself so that it does not introduce any gain or phase difference in the channel in which it operates. By virtue of their noise reduction properties, the signal processing systems in the present application enable a clean trace to be shown even if the signal to noise ratio is substantially reduced. In the net effect, the radio direction finder 50 employing these signal processing systems is made more sensitive and can effectively be used over an increased distance. The improvement is independent of the sensitivity of the direction finding antenna 40, 41, 42 used with the system and is also independent at the atmospheric or cosmic noise as long as the latter two are of random (white noise) nature.

Insertion of the signal processing systems in the Watson-Watt three channel radio direction finder does not impair its value of indicating local reradiation and of being capable of indicating direction of two or more signals within the pass-band of the associated receiver. In the respective cases the random noise blur is eliminated, leaving a clear ellipse or parallelogram, or a combination of both. In this application, the time constants of the three noise filters are made equal and are adjusted according to the nature of the noise and of the signal so as to eliminate the nose as far as possible while retaining adequate speed of response. Such a time constant may be selected by means of a switch to be operated manually or automatically with other controls.

In this radio direction finder, it is often expedient to commutate two of the receiver channels periodically in order to examine the accuracy of the channel balance. Two different bearings are shown alternatively if an unbalance exists. In a known method the two bearings are compared and the gain and balance adjustments are operated until the difference is reduced to zero. With the signal processing system installed in all three channels, it is possible to increase the time constant of noise averaging until it becomes much longer than the commutation period. In this way the output of each signal processing system will indicate the average gain and phase of the commutated channels. This application substantially eliminates the need for channel balancing, manual or automatic, so long as a reasonable balance is present in the receiver so that linear approximations are valid for sine and cosine functions of the bearing angle.

FIG. 3 depicts another application related to Watson-Watt type radio direction finding circuits. The system in FIG. 2 can be simplified to that appearing in FIG. 3. The three channel DF antenna 40, 41 and 42, the commutation switches 51 and 52 and the signal processing systems 20, 21 and 22 feeding to a cathode ray tube bearing indicator are retained, but only a single channel receiver 55 is used in place of the three channels. The receiver is periodically switched into each channel in the 1-2-3 sequence providing synchronizing pulses in turn to each of the signal processing system oscillators.

The time constant of each signal processing system is set large enough to maintain the frequency and amplitude of oscillation constant over the commutation gap. In this way the gain and phase matched three channel receiver can be replaced by a single channel receiver of communication type at a great saving in cost. The price to pay for this simplification is the long time constant of the signal processing system which means that bearings cannot be taken on signals of very short duration or while scanning the frequency spectrum.

This application for use with a single channel receiver must not be confused with a known method, also for a single channel receiver, which makes use of charging a capacitor to the amplitude of channel voltage but has no memory storage for its phase. The present signal processing system stores both amplitude and phase information and its application retains full advantage of the Watson-Watt method without the costly matched receivers.

While the present invention has been described with respect to the details of the various illustrated embodiments depicted, changes and variations will occur to those skilled in the art on reading the description, and such can obviously be made without departing from the scope of the present invention.

What I claim as my invention:

1. An electronic signal processing system for an alternating voltage input signal comprising a phase-locked loop network having an input adapted to receive said signal and produce an intermediate signal comprising a substantially noise free sine wave with a phase equal to the average phase of said input signal, said intermediate signal being applied to an input of a variable gain amplifier which, for any particular value of gain, produces an output signal proportional to said intermediate signal, and an amplitude averaging loop network having said input signal and said output signal as its inputs which produces a biasing signal which is applied to a control input of said variable gain amplifier to maintain said output signal equal in amplitude to the average amplitude of said input signal.

2. The electronic signal processing system according to claim 1 wherein said phase-locked loop network contains a frequency scaling circuit such that the output signal has a frequency proportional to said input signal.

3. The electronic signal processing system according to claim 1 wherein said amplitude averaging loop network contains a voltage scaling circuit such that the amplitude of the output signal is proportional to that of said input signal.

4. An electronic signal processing system according to claim 2 or 3 wherein both the frequency of the output signal and the amplitude of the output signal are proportional to that of the said input signal.

5. The electronic signal processing system according to claim 1 in combination with a Watson-Watt type radio direction finder having a three channel receiver and a cathode ray tube bearing indicator wherein said signal processing systems are inserted between the output of each receiver channel and the respective inputs of a cathode ray tube bearing indicator.

6. The combination of claim 5 in which the Watson-Watt type radio direction finder has its receiver channels commutated, wherein the time averaging constant of the signal processing system is longer than said commutation period, such that said signal processing system indicates the average gain and phase of the commutated channels.

7. The electronic signal processing system according to claim 1 in combination with a Watson-Watt radio direction finder having a single channel receiver commutated between three channels, said signal processing system being connected between the output of said single channel receiver and the inputs to a cathode ray tube indicator, said single processing systems having a time averaging constant longer than the commutation gap of the single channel receiver.

* * * * *